United States Patent
Wang (10) Patent No.: US 6,289,779 B1
(45) Date of Patent: Sep. 18, 2001

(54) CARPENTER'S SAWING MACHINE

(76) Inventor: Tian Shoei Wang, No. 232, Doou-Tarn Rd., Shaluh Town, Taichung County (TW)

( * ) Notice: Subject to any disclaimer, the term of this patent is extended or adjusted under 35 U.S.C. 154(b) by 0 days.

(21) Appl. No.: 09/369,287

(22) Filed: Aug. 4, 1999

(51) Int. Cl.[7] .................................................. B27B 21/00
(52) U.S. Cl. .................................. 83/759; 83/766; 83/767
(58) Field of Search .......................... 83/571, 759, 762, 83/763, 764, 766, 767; 30/509, 512, 513

(56) References Cited

U.S. PATENT DOCUMENTS

| | | | |
|---|---|---|---|
| 198,472 | * 12/1877 | Garretson | 83/766 |
| 766,799 | * 8/1904 | Richards | 83/767 |
| 1,063,113 | * 5/1913 | Bremer | 83/766 |
| 1,182,068 | * 5/1916 | Ayer | 83/767 |
| 1,259,380 | * 3/1918 | Eagleson | 83/766 |
| 5,259,284 | * 11/1993 | Chen | 83/766 |
| 5,575,191 | * 11/1996 | Wang | 83/766 |
| 5,713,258 | * 2/1998 | Keddie | 83/767 |

* cited by examiner

Primary Examiner—Rinaldi I. Rada
Assistant Examiner—Thomas J. Druan, Jr.
(74) Attorney, Agent, or Firm—Pro-Techtor International Services

(57) ABSTRACT

A carpenter's sawing machine that includes a base, an elongated saw support body, and a saw. The saw support body is pivotally attached to the base to change a first cutting angle of the saw. The saw is pivotally mounted in the saw support base to change a second cutting angle of the saw. The sawing machine is therefore capable of serving as a compound miter saw.

5 Claims, 9 Drawing Sheets

FIG.8

CARPENTER'S SAWING MACHINE

FIELD OF THE INVENTION

The present invention relates generally to a sawing machine, and more particularly to a carpenter's sawing machine capable of sawing in a horizontal direction and a longitudinal direction.

BACKGROUND OF THE INVENTION

A carpenter's sawing machine disclosed in the Taiwan Pat. 215,621 comprises a base which is provided with a long frame body fastened pivotally therewith. The frame body is provided in two sides thereof with a fastening seat which is in turn provided at the top thereof with two slide rods fastened uprightly therewith. The slide rods are intended to hold a hacksaw. The base is provided at the top thereof with a sectoral recess extending outward at an angle of 90 degrees. The sectoral recess is provided thereon with an angle graduation and in the bottom thereof with a locating hole opposite to the angle cutting line. Located oppositely to the locating hole is an urging rod and a curved rod which is fastened pivotally with the urging rod. The frame body is further provided in the lower end thereof with a pivot serving as a pivoting point of the curved rod, and a spring for confining the curved rod.

The long frame body is provided at both ends thereof with a round shaft sleeve which is provided in the center thereof with a recess of a predetermined depth. The recess is provided with an expanded opening. The recess is further provided in the periphery thereof with a plurality of locating holes. The fastening seat is engaged with a C-shaped ring of the shaft sleeve. The inner diameter of the fastening seat is corresponding to the outer diameter of the shaft sleeve such that their axes are aligned with the cutting bottom line of the hacksaw. The locating hole is further provided with a plurality of locating pin holes in which a locating pin and a spring are disposed pivotally.

Figure 1:
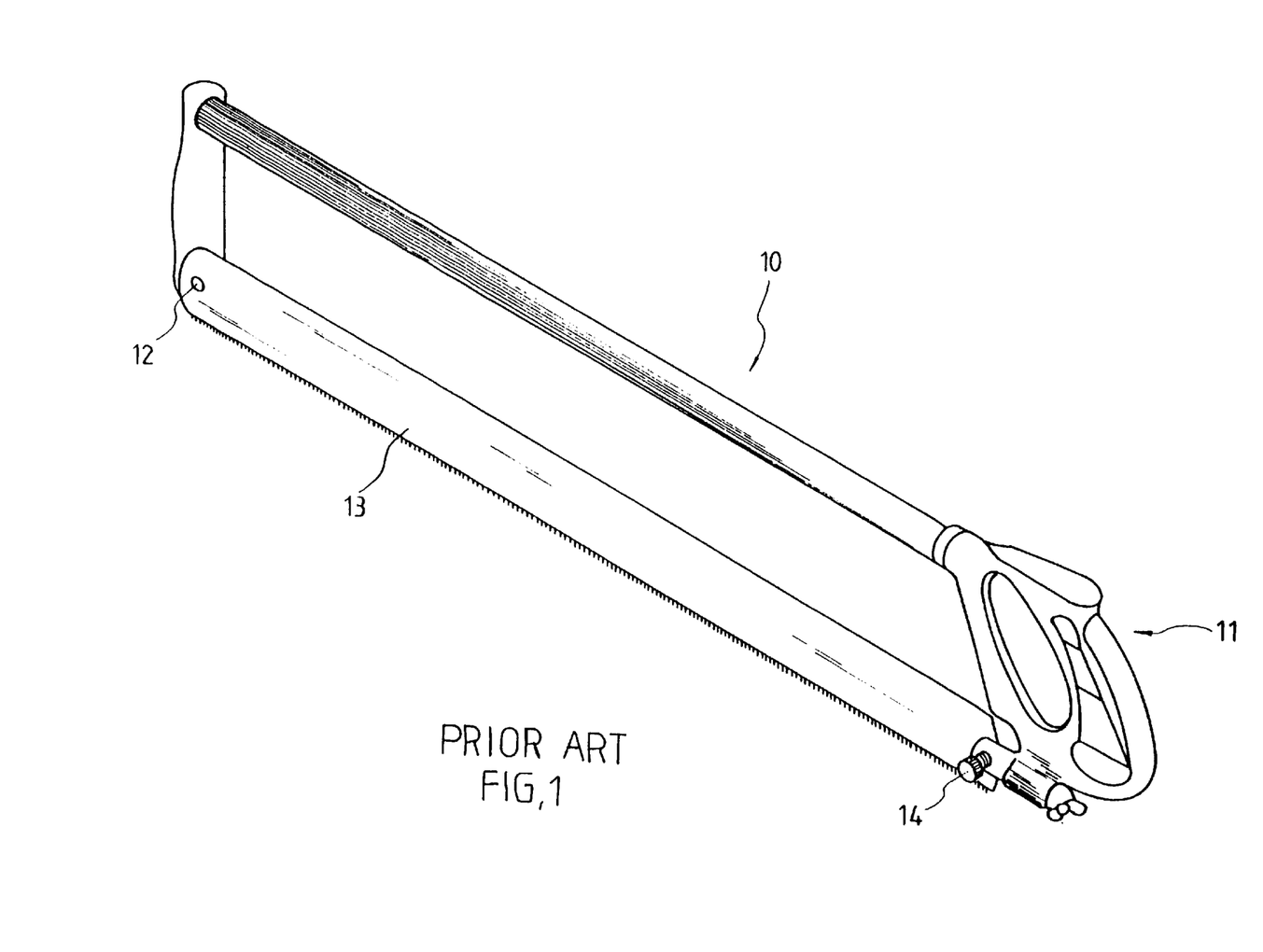
FIG. 1 shows an exploded view of a carpenter's sawing machine of the prior art.

As shown in FIG. 1, the hacksaw is provided with a body 10 which is provided at one end thereof with a grip 11, and at other end thereof with an insertion portion 12 for fastening one end of a blade 13. The blade 13 is fastened at other end thereof with the grip 11 by a screw 14.

The prior art sawing machine described above has several drawbacks, which are explicitly described hereinafter.

The curved rod is used to adjust the horizontal cutting angle of the workpiece. The curved rod is engaged in the radial displacement, which is different from the horizontal adjustment of the long frame body. The radial motion is prone to cause the overturn of the whole set of structure and is inconsistent with the inertia motion of the mechanics of the human body.

The longitudinal cutting angle of the workpiece is changed mainly by the outer diametrical rotation of the fastening seat. The shaft sleeve and the fastening seat are pivoted by the locating hole and the locating pin in conjunction with the spring. It requires a precision technique to form a vertical hole along the radial direction in view of the locating hole and the locating being disposed respectively at the radial positions of the shaft sleeve and the fastening seat. As a result, the sawing machine of the prior art is not cost-effective.

The body 10, the insertion portion 12, the grip 11, and the blade 13 are fastened in a "single point" manner such that the blade 13 is prone to become loosened to result in a sawing work of a poor quality.

SUMMARY OF THE INVENTION

The primary objective of the present invention is to provide a carpenter's sawing machine, which comprises a base which is provided with a long support body. The base is provided at the top thereof with a sectoral recess of an angle of 90 degrees and extending outwards from the pivoting place of the long support body. The sectoral recess is provided with a angle graduation in cooperation with a pointer of the long support body. The long support body is provided at one end thereof with a round urging portion which is provided radially with a dividing head seat. The urging portion and the dividing head seat are provided with a recessed portion. The dividing heat seat is provided axially with a fastening hole. An adjustment seat is provided such that the adjustment seat is opposite to the urging portion and the dividing head seat. The adjustment seat can be fitted over the dividing head seat such that the adjustment seat is joined with the C-shaped ring of the urging portion. The C-shaped opening is provided with a straight rod for fastening the hacksaw. The adjustment seat is provided axially with the graduation. The adjustment seat is provided with a fastening hole in which a ball and a spring are disposed. The ball and the spring are confined by a screw. The adjustment seat cooperates with a press plate which is provided with a fastening hole and a threaded hole. The hacksaw comprises a main body which is provided at one end thereof with a grip which is provided at the lower end thereof with a pivoting portion. The main body is provided at other end thereof with an adjustment portion. The pivoting portion and the adjustment portion are connected with the blade. The present invention is characterized by the sectoral recess whose side wall is provided with a locating slot opposite to the angle graduation. The long support body is provided with a slide slot which is provided at both ends thereof with a suspension frame. The long support body is provided with a stop recess opposite to other end of the base. The slide slot is provided with an angle locating element which is provided with a retaining block. The angle locating element is provided thereunder with a hole and a movable hole in communication with the hole. A push rod is provided with a curved portion and a straight rod extending from the curved portion. The straight rod is provided with a spring. The push rod is provided with a locating threaded hole engageable with a locating screw. The dividing head seat is provided in the periphery thereof with a groove of a special angle. The adjustment seat is provided with an insertion slot and a specially-angled hole. The press plate is provided with an insertion strip opposite to the insertion slot of the adjustment seat. The fastening hole of the press plate and the fastening hole of the dividing head seat are engaged with a fastening screw. The specially-angled hole of the adjustment seat and the threaded hole of the press plate are provided with a C-type screw which is provided at the front thereof with a threaded portion and a press rod body extending from the threaded portion and having a diameter smaller than the diameter of the threaded portion. The specially-angled hole has a depth greater than the length of the press rod body. The pivoting portion is provided with a long strip hole for disposing the blade. The main body is provided with a pivoting hole in cooperation with a pivoting element of the blade. The pivoting element is provided with an insertion portion opposite to the hole of the blade. The adjustment portion comprises a long strip hole for disposing the blade. The main body is provided in two sides thereof with a long hole which is provided in the periphery thereof with the insertion slot. The main body is provided at the front end thereof with a recessed portion. A bracing element is provided in conjunction with the insertion slot. The bracing element is provided in two sides thereof with a pivoting hole engageable with a pivoting element which is provided with an insertion portion. The bracing element is further provided with an adjustment threaded hole corresponding in location to the recessed portion and engageable with an adjustment screw.

DETAILED DESCRIPTION OF THE INVENTION

Figure 2:
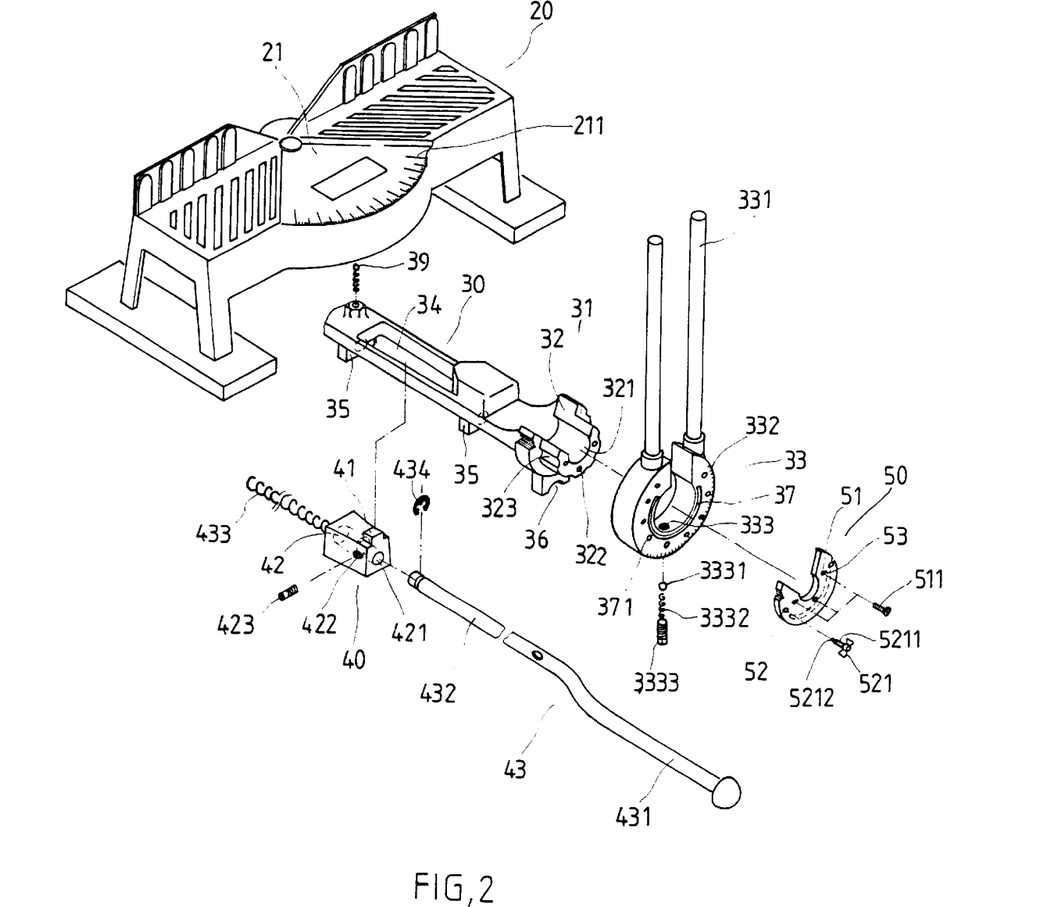
FIG. 2 shows an exploded view of the present invention.
Figure 3:
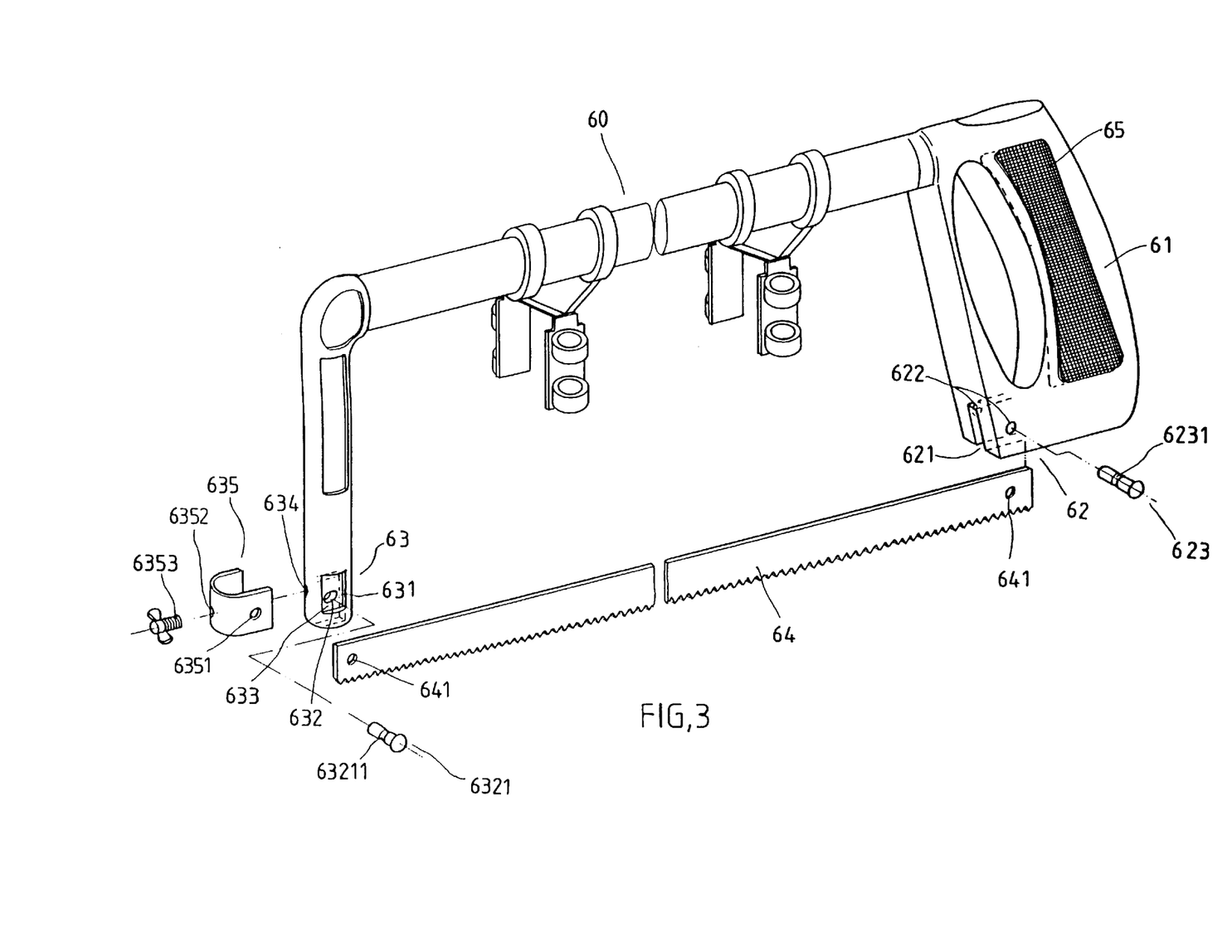
FIG. 3 shows a partial enlarged exploded view of the present invention.
Figure 4:
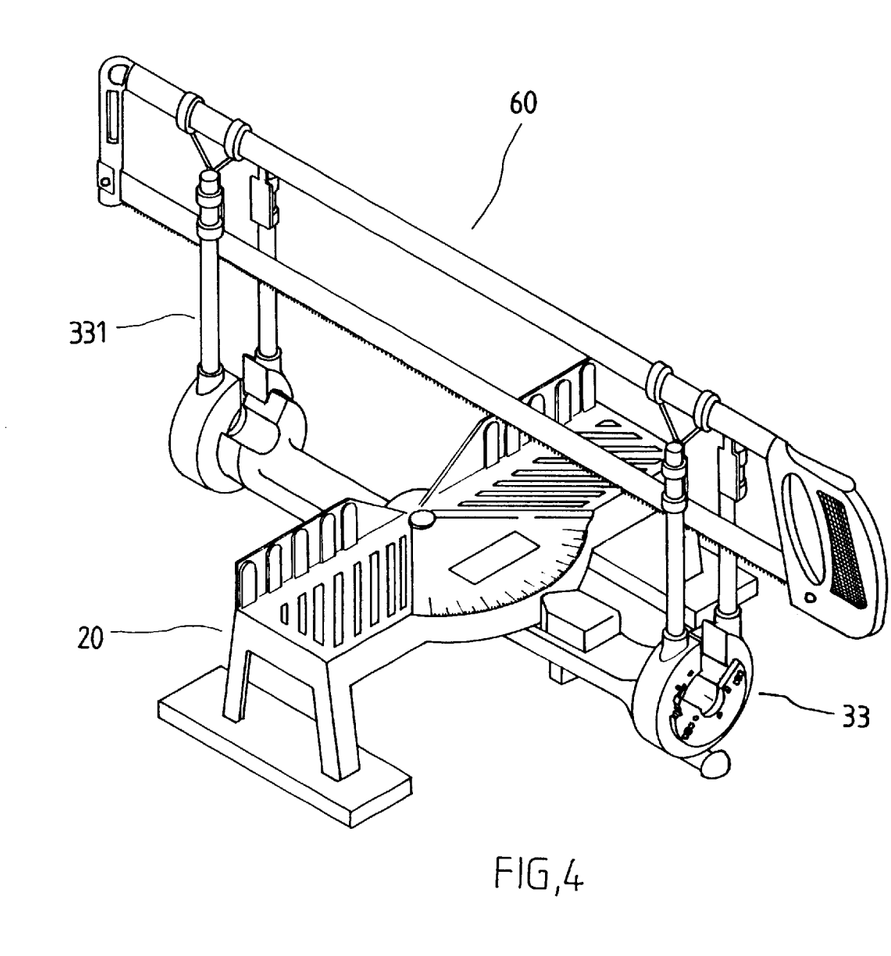
FIG. 4 shows a schematic view of the structure of the present invention.

As shown in FIGS. 2, 3 and 4, a carpenter's sawing machine of the present invention comprises a base 20 which is provided at the bottom thereof with a long support body 30. The base 20 is provided at the top thereof with a sectoral recess 21 extending from the pivoting point of the long support body 30 and having an angle of 90 degrees. The sectoral recess 21 is provided with an angle graduation 211. The long support body 30 is provided with an indicator in cooperation with the angle graduation 211.

The long support body 30 is provided at one end thereof with a connecting portion 31 of a round shape. The connecting portion 31 is radially reduced to form a dividing head seat 32 which is provided in the center thereof with a recessed portion 321. The dividing head seat 32 is provided axially with a fastening hole 322. An adjustment seat 33 is opposite to the connecting portion 31 and the dividing head seat 32. The adjustment seat 33 is fitted over the dividing head seat 32 such that the adjustment seat 33 is joined with the C-shaped fitting ring of the connecting portion 31. Located at both ends of a C-shaped opening is a straight rod 331 for mounting a hacksaw. The adjustment seat 33 is provided with a graduation 332, and a fastening hole 333 in which a ball 3331, a spring 3332, and a screw 3333 are disposed such that the ball 3331 and the spring 3332 are confined by the screw 3333. A press plate 50 is provided with a locking hole 51 and a threaded hole 52.

The hacksaw comprises a main body 60 which is provided at one end thereof with a grip potion 61 which is in turn provided with a pivoting portion 62. The main body 60 is provided at other end thereof with an adjustment portion 63. The pivoting portion 62 and the adjustment portion 63 are connected with the holes 641 of two ends of the blade 64.

Figure 5:
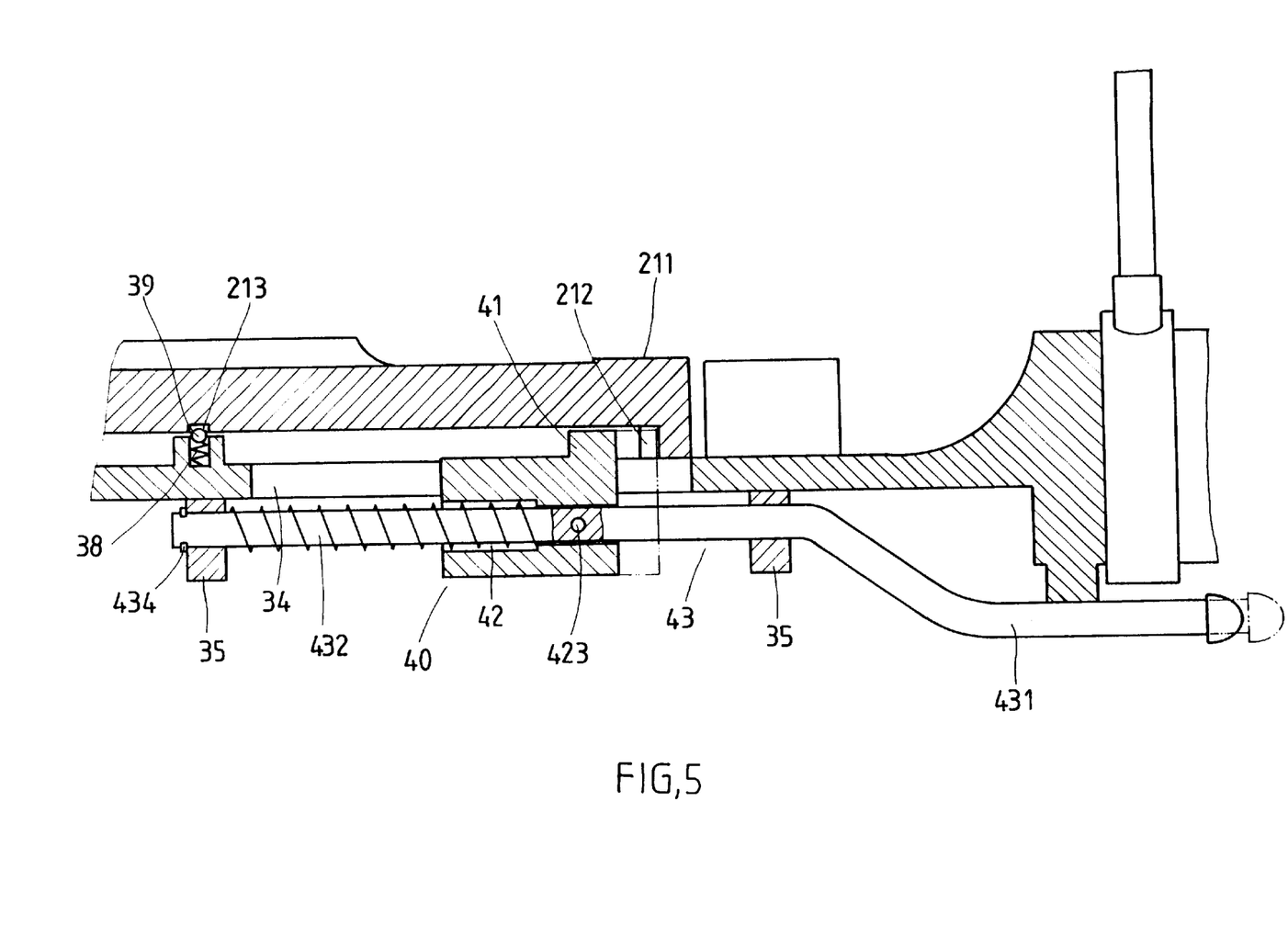
FIG. 5 shows a partial sectional view of FIG. 2.
Figure 6:
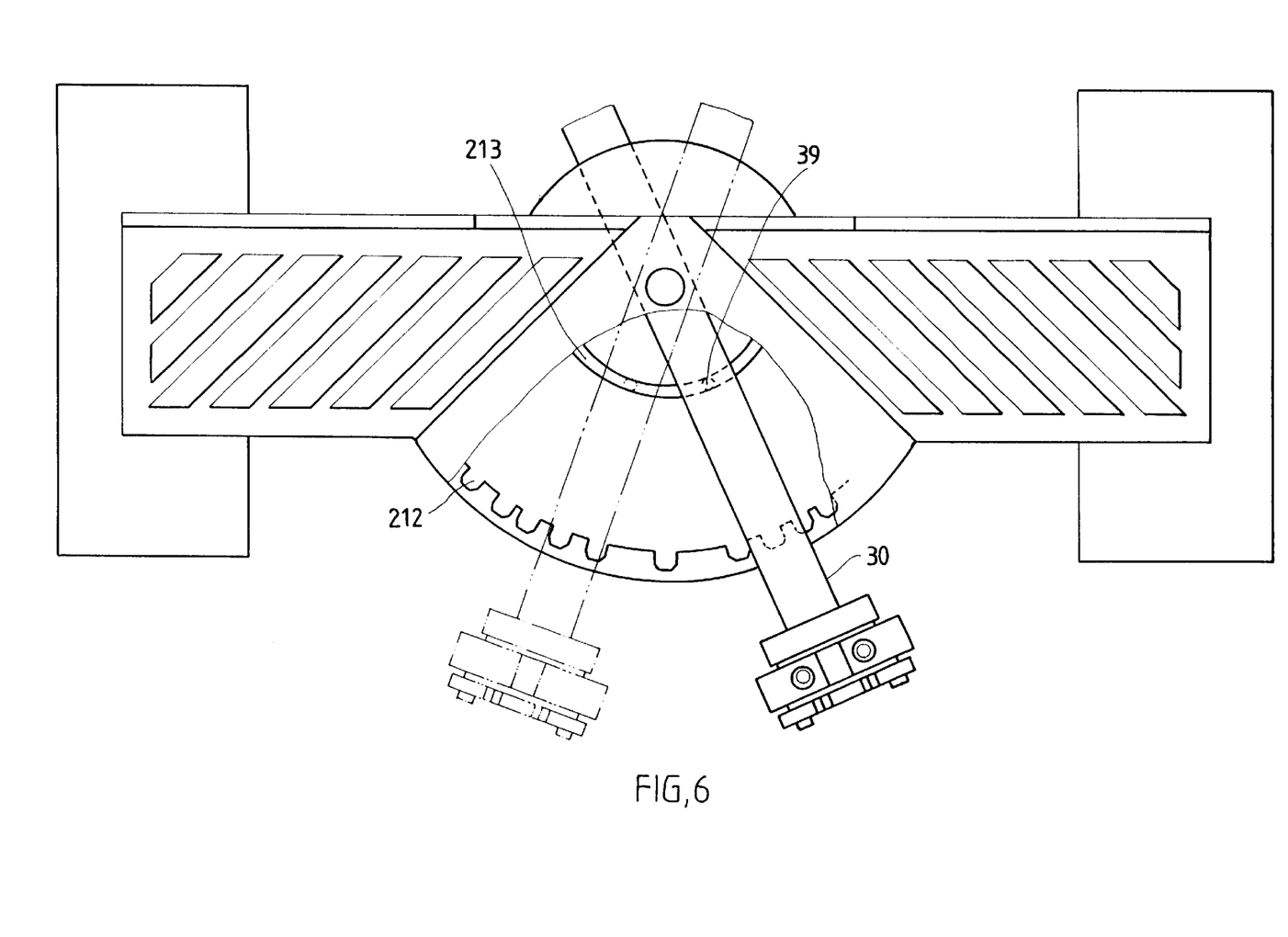
FIG. 6 shows a partial top sectional view of FIG. 2.

The sectoral recess 21 is provided in the side wall thereof with a locating slot 212 opposite to the angle graduation 211, as shown in FIGS. 5 and 6. The long support body 30 is provided with a slide slot 34 which is provided at both ends thereof with a suspension frame 35. The long support body 30 is provided with a stop recess 36 opposite to other end of the base 20. An angle locating element 40 is provided with a retaining block 41 opposite in location to the locating recess 212 of the sectoral recess 21. The angle locating element 40 is further provided with a hole 42 a hole 421 smaller in diameter than the hole 49 and a push rod 43 having a curved portion 431 which is provided with a straight body 432 extending therefrom. The curved portion 431 of the push rod 43 comes in contact with the stop recess 36 of the long support body 30. The straight body 432 is put through the suspension frame 35, the hole 42, and the movable hole 421. The straight body 432 is provided with a spring 433 which is confined between the movable hole 421 of the angle locating element 40 and the suspension frame 35 of the long support body 30. The angle locating element 40 is provided with a locating threaded hole 422 engageable with the locating screw 423 of the push rod 43.

The base 20 is provided with a slide slot 213 which is separated from the locating slot 212 by an appropriate distance, as shown in FIGS. 5 and 6. The long support body 30 is provided with a spring 38 and a steel ball 39. In the process of horizontal adjustment of the hacksaw for adjusting the cutting angle, the spring 38 and the steel ball 39 slide in the slide slot 213 for easy adjustment in cutting angle. As shown in FIGS. 2 and 5, the push rod 43 is provided with a retaining element 434.

In the process of changing the horizontal cutting position of the hacksaw, the curved portion 431 of the push rod 43 is pushed forward along the axial direction of the long support body 30, thereby causing the angle locating element 40 to move backward along the slide slot 34 of the long support body 30. In the meantime, the spring 433 is compressed. As a result, the retaining block 41 moves out of the locating slot 212. The long support body 30 can be thus moved horizontally under the base 20. As the curved portion 431 of the push rod 43 is loosened, the angle locating element 40 is forced to move backward by the elastic force of the spring 433 such that the retaining block 41 is retained in the locating slot 212 of a predetermined angle.

The base 20 is provided with a slide slot 213 which is separated from the locating slot 212 by an appropriate distance, as shown in FIGS. 5 and 6. The long support body 30 is provided with a spring 38 and a steel ball 39. In the process of horizontal adjustment of the hacksaw for adjusting the cutting angle, the spring 38 and the steel ball 39 slide in the slide slot 213 for easy adjustment in cutting angle. As shown in FIGS. 2 and 5, the push rod 43 is provided with a retaining element 434.

The dividing head seat 32 is provided with a plurality of the specially-angled grooves 323 for retaining the ball 3331 of the adjustment seat 33. The adjustment seat 33 is provided with the insertion slot 37 for inserting the press plate 50. The insertion slot 37 is provided with a plurality of the specially-angled holes 371. The press plate 50 is provided with the insertion strip 53 engageable with the insertion slot 37. The press plate 50 is fastened with the dividing head seat 32 by a fastening screw 511 which is engaged with the fastening hole 322 of the dividing head seat 32. The adjustment seat 33 is fastened pivotally between the urging portion 31 and the press plate 50, as shown in FIG. 7.

Figure 7A:
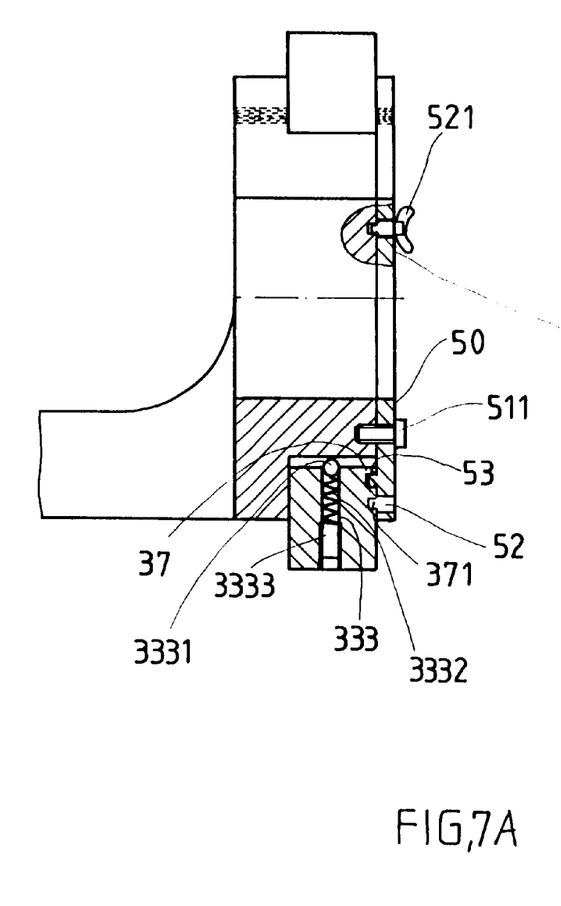
FIG. 7 shows a partial enlarged sectional view of FIG. 2.
Figure 7B:
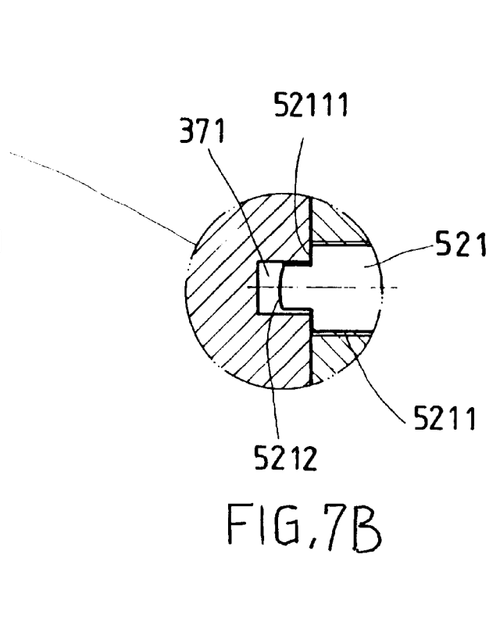
Figure 8:
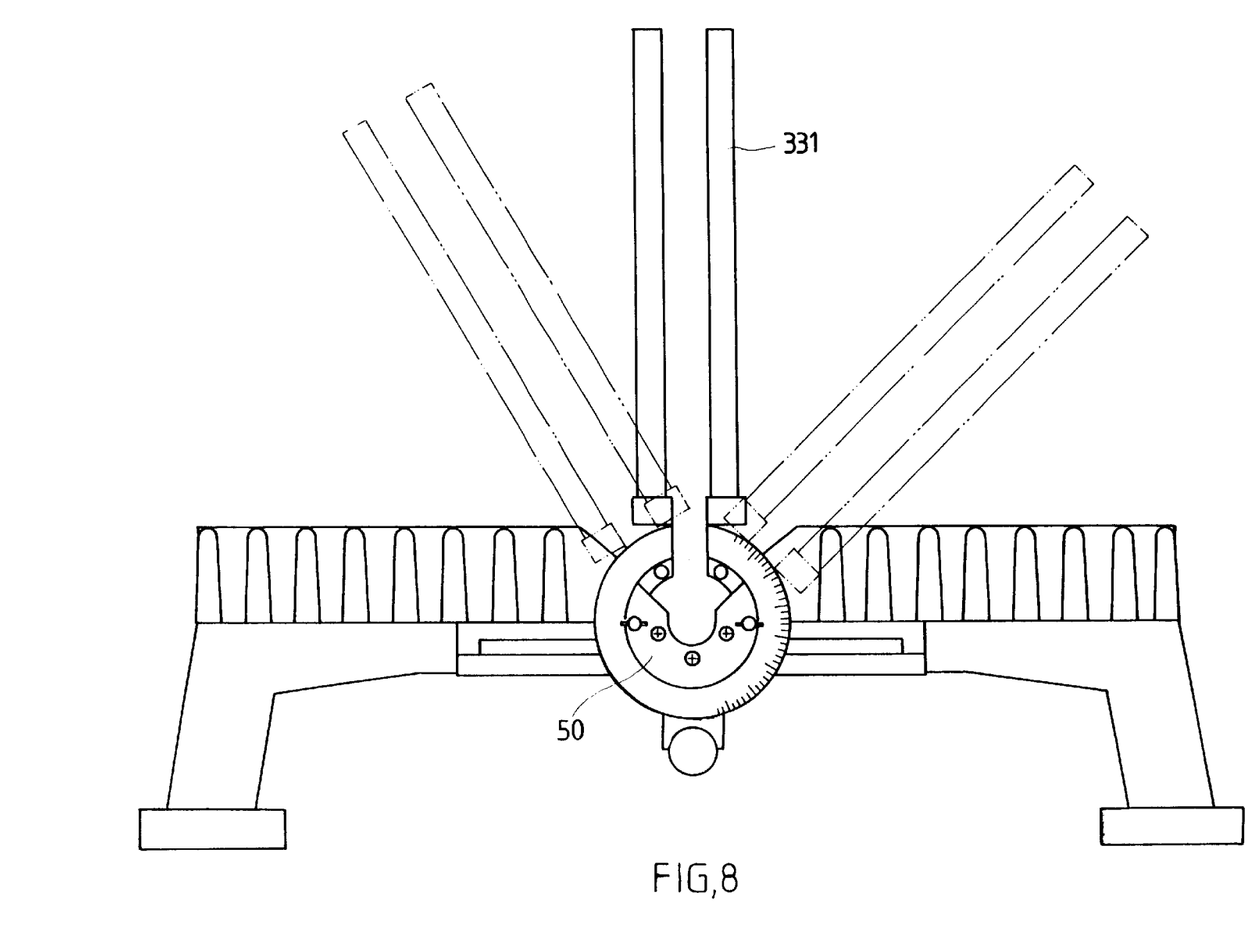
FIG. 8 shows a partial schematic view of FIG. 2.

In conjunction with the specially-angled hole 371 of the adjustment seat 33 and the threaded hole 52 of the press plate 50, the threaded hole 52 is provided with a C-type screw 521, as shown in FIG. 7. The C-type screw 521 is provided at the front section thereof with a threaded portion 5211 which has a press rod body 5212 smaller in diameter than the threaded portion 5211. The C-type screw 521 is engaged with the threaded hole 52 of the press plate 50 such that an axial surface 52111 of the threaded portion 5211 urges the adjustment seat 33 which in turn urges the stop portion 31 of the long support body 30, and that the press rod body 5212 of the threaded portion 5211 in inserted into the specially-angled hole 371 of the 5211 in inserted into the specially-angled hole 371 of the adjustment seat 33. The specially-angled hole 371 has a depth greater than the length of the press rod body 5212. As a result, the adjustment seat 33 is located with stability and precision, as shown in FIG. 8.

In the process of changing the longitudinal cutting angle of the hacksaw, the C-type screw is loosened. As the angle is adjusted, the C-type screw is inserted into the specially-angled hole. The specially-angled hole of the adjustment seat is located in the axial surface of the adjustment seat. Such a design as described above is to facilitate the molding of the device with precision.

The pivoting portion 62 is provided with a long strip hole 621, which is separated from the grip portion 61 of the main body 60 of the hacksaw by an appropriate distance and is intended to receive the blade 64. The pivoting portion 62 is further provided with a pivoting hole 622. The blade 64 is provided with a hole 641. The pivoting element 623 is provided with an insertion portion 6231. The blade 64 is fastened pivotally by the pivoting element 623 which is received in the pivoting hole 622 of the pivoting portion 62 and the hole 641 of the blade 64.

The adjustment portion 63 is provided with a long strip hole 631 which is separated from the main body 60 of the hacksaw by an appropriate distance and is intended to accommodate the saw blade 64. The adjustment portion 63 is further provided with a long hole 632 which is in turn provided in the periphery thereof with an insertion slot 633, a recessed portion 634 contiguous to the converging point of the centers of the two long holes 632. A bracing element 635 of a U-shaped piece body is provided in two sides thereof with a pivoting hole 6351 opposite to the long hole 632. A pivoting element 6321 is provided to cooperate with the pivoting hole 6351, the long hole 632, and the hole 641 of the saw blade 64. The pivoting element 6321 is provided with an insertion portion 63211 opposite to the hole 641 of the saw blade 64. The bracing element 635 is provided with an adjusting threaded hole 6352 opposite to the recessed portion 634 and engageable with an adjusting screw 6353.

Figure 9:
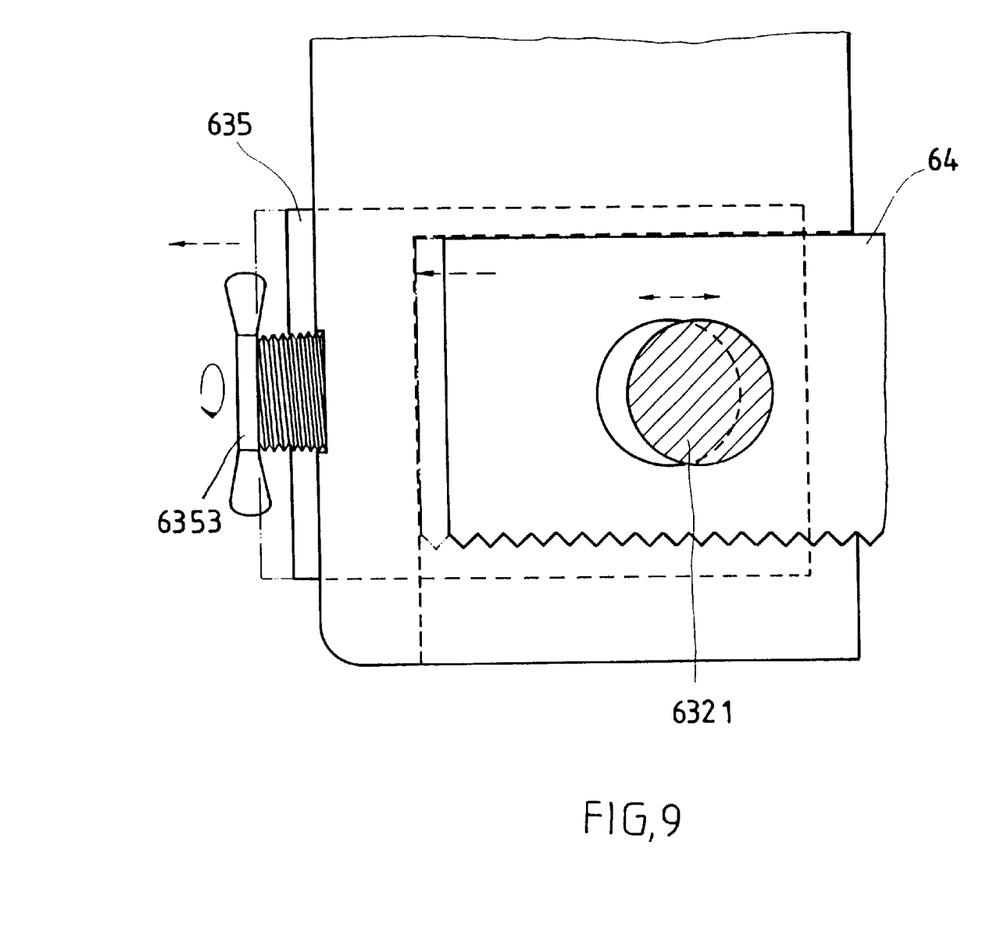
FIG. 9 shows a partial schematic view of FIG. 3.

As shown in FIG. 9, the adjustment screw 6353 is fastened to press against the recessed portion 634 of the main body 60. Thereafter, the adjustment screw 6353 is turned continually so as to cause the bracing element 635 to move backward. As the bracing element 635 is moved backward, the pivoting element 6321 is actuated to move backward in the long hole 632. As a result, the blade 64 is braced and fastened.

The grip portion 61 of the main body 60 is provided in both sides thereof with a skidproof block 65 to facilitate the holding of the main body 60.

What is claimed is:

1. A carpenter's sawing machine comprising:

a base provided with a long support body, said base includes a ninety degree sectoral recess extending outward from a pivot point of said long support body, said sectoral recess is provided with angle indicators in cooperation with a pointer of said long support body, said long support body is further provided at a first end thereof with a connecting portion which is radially provided with a dividing head seat, said connecting portion and said dividing head seat being provided with a recessed portion, said long support body further includes an adjustment seat mounted on said dividing head seat, said adjustment seat being provided with angle indicators, said adjustment seat includes a fastening hole in which a ball and a spring are disposed such that said ball and said spring are confined by a screw, said adjustment seat being in cooperation with a press plate which is provided with a fastening hole and a threaded hole, a saw comprising a main body which is provided at a first end thereof with a grip portion that includes a pivoting portion, said main body further includes at a second end thereof an adjustment portion, with said pivoting portion and said adjustment portion being connected to a blade of said saw; wherein said sectoral recess is provided in a side wall thereof with a locating slot opposite to said angle indicators of said sectoral recess, said long support body being provided with a slide slot which is provided with a suspension frame, said long support body further being provided with a stop recess, said slide slot being provided with an angle locating element which is in turn provided with a retaining block, a push rod is mounted on said long support body, said push rod being provided with a curved portion and a straight rod extending from said curved portion, said straight rod being provided with a spring, said push rod further being provided with a locating threaded hole which is engaged with a locating screw, said dividing head seat is provided with an angled groove, said adjustment seat is provided with an insertion slot and an angled hole, said press plate is provided with an insertion strip opposite in location to said insertion slot of said adjustment seat, said fastening hole of said press plate and said fastening hole of said dividing head seat being engaged with a fastening screw, said pivoting portion is provided with a long strip hole for receiving said blade, and said main body is provided with a pivoting hole in cooperation with a pivoting element of said blade, said pivoting element is provided with an insertion portion opposite a hole in said blade, said adjustment portion comprising a long strip hole to receive said blade, said main body is provided in two sides thereof with a long hole which is provided in a periphery thereof with an insertion slot, said main body provided at a front end thereof with a recessed portion, a bracing element being provided in conjunction with said insertion slot, said bracing element provided in two sides thereof with a pivoting hole which is engaged with a pivoting element which is provided with an insertion portion, said bracing element is further provided with an adjustment threaded hole corresponding in location to said recessed portion and engageable with an adjustment screw.

2. The carpenter's sawing machine as defined in claim 1, wherein:

said base is provided with a slide slot which is separated from said locating slot; and wherein said long support body is provided with a spring and a steel ball which are corresponding in location to said slide slot.

3. The carpenter's sawing machine as defined in claim 1, wherein:

said straight rod is provided with a retaining element located at an area of contact between said straight rod and said suspension frame of said long support body.

4. The carpenter's sawing machine as defined in claim 1, wherein:

said bracing element is a U-shaped body.

5. The carpenter's sawing machine as defined in claim 1, wherein:

said grip portion is provided with a skidproof block.

* * * * *